H. WOODMAN.
Metal Drill.
No. 20,385.
Patented May 25, 1858.
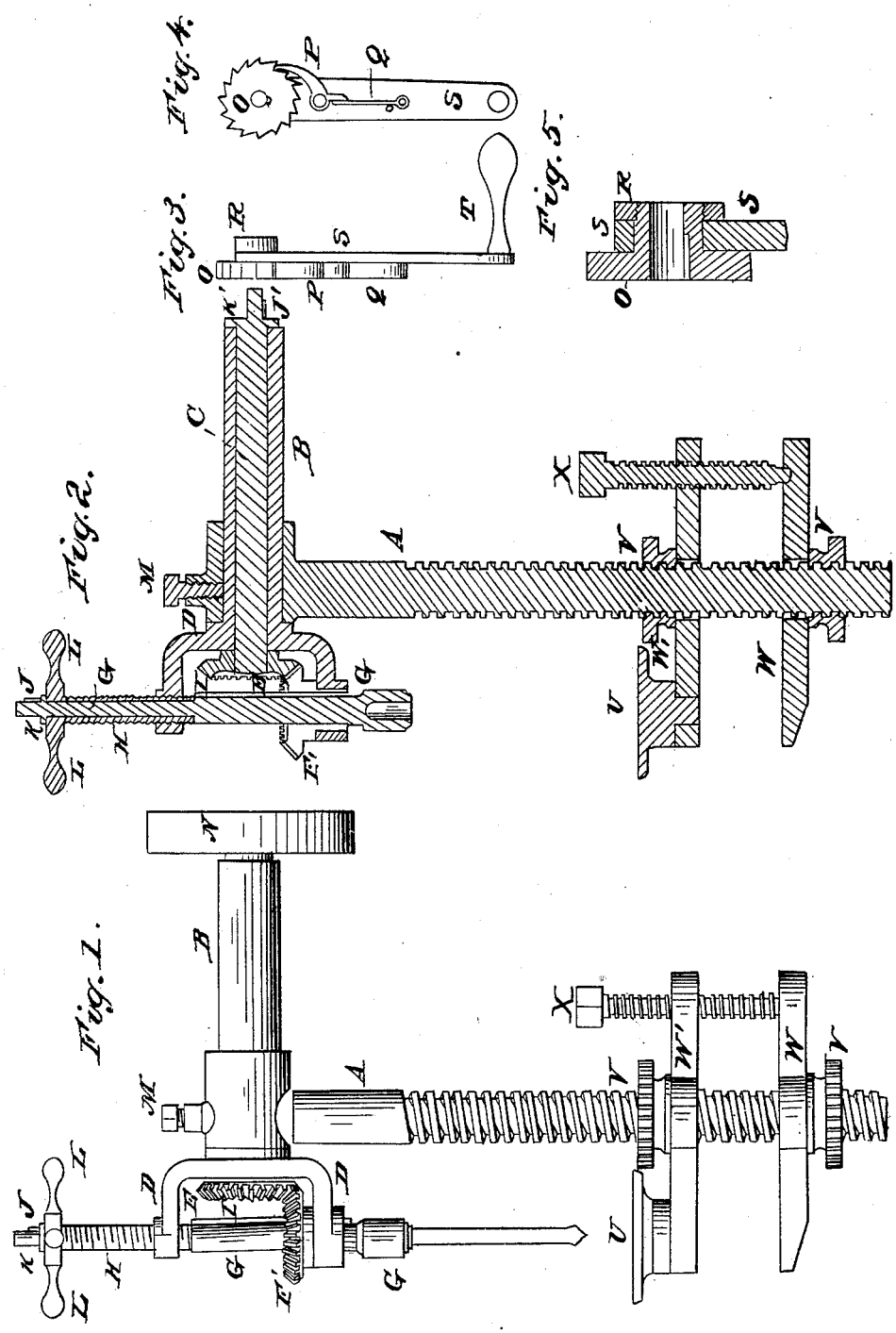

UNITED STATES PATENT OFFICE.

HORACE WOODMAN, OF BIDDEFORD, MAINE.

POWER AND HAND DRILL.

Specification of Letters Patent No. 20,385, dated May 25, 1858.

*To all whom it may concern:*

Be it known that I, HORACE WOODMAN, of Biddeford, in the county of York and State of Maine, have invented an Improved Drilling-Machine; and I do hereby declare that the same is fully described and represented in the following specification and the accompanying drawings, letters, figures, and references thereof.

Of the said drawings, Figure 1, denotes a side elevation of said drilling machine. Fig. 2, denotes a vertical central and longitudinal section of it. Such other figures as may be necessary to a full description and delineation of my invention will be hereinafter particularly referred to and described.

The nature of my invention consists in so constructing and arranging the head of my drilling machine, that the spindle can be placed on any desired angle and firmly held in place during the process of drilling and also combining with the hand drilling machine the pulley and platen so that it can be used as a power drilling machine.

A represents the main frame or post of a drilling machine while W, W', represent the clamping jaws by which the machine is attached to a frame or any object to be drilled. There is a thread cut on or around a portion of said post to which is fitted the nuts V, V, said jaws fitting loosely on said post between said nuts as seen in the drawings in Figs. 1 and 2. There is near one end of the jaw W, the platen U, while through at or near the other end is the screw X, the point of said screw being stepped in the jaw W, as seen in Fig. 2, of the drawings. There is a hole through the upper part or head of said post A, at right angles to its body or main part. Through this hole passes the tube B, to one end of which is attached the frame D. This frame supports in suitable bearings the bevel gears F and F', the spindle G, and the hollow screw H, arranged as seen in the drawings. The spindle G, has a socket at its lower end into which is received the drill, and there is embedded in that portion of said spindle which fits and traverses in gear F', a spline or feather I, which fits a groove cut in the hollow bearing of said gear, and by it said spindle is turned whenever rotary motion is given to said gear. The said spindle also passes through the hollow screw H in which it turns freely, and fixed on said spindle above said screw is collar K, to hold said spindle in place. The screw H, is fitted to a corresponding screw or thread in frame D as seen in the drawings, and is provided at its upper end with handles L, L, said screw and handles being for the purpose of traversing and feeding the drill and spindle when in use. There is fitted in the tube B, and turning freely therein the shaft C, on one end of which is fixed the bevel gear F, while on the other end outside the collar K', is placed the driving pulley N. Whenever rotary motion is given to said pulley it communicates rotary motion to spindle G, by means of shaft C, and gears F and F'.

When it is desired to operate the machine by hand the pulley can be removed and the crank put on in its place or if not convenient to operate the crank at this point it can be placed on spindle G above the collar K where the same result will be obtained. The said crank being so constructed that if any obstacle is in the way to prevent the operator from turning said crank the whole way around (which is frequently the case in setting up machinery) it can be worked by a reciprocating motion and propel the drill all the time in one direction, the said crank being formed as seen in Fig. 3, which is a side view, in Fig. 4, which is an inside view and Fig. 5, which is a central view of a portion of said crank. The brake S, of said crank is provided with a bearing on the hub of ratchet gear O, between the teeth and nut R as seen in the drawing. There is attached to said brake the pawl P, so arranged that its point comes into engagement with the teeth of ratchet gear O, the spring Q being for the purpose of holding said pawl into engagement with said gear, and also of allowing said pawl to slip over the points of said teeth and reëngage whenever said brake is drawn backward. The said pulley and crank being fitted to both the shaft C and spindle G, and turn said shaft and spindle by means of the splines J, and J', fitting grooves cut in the hollow bearings of said pulley and crank. In using said machine as a power drill it can be attached to a bench or any convenient place by inserting between the clamping jaws the object to which it is to be attached and turning the nuts V, V, up against the jaws until the said jaws grip them. By turning the screw X down it will force the ends of the jaws to which it is attached apart and cause the opposite ends of said jaws to nip and hold said machine thereto.

The platen U is for the purpose of laying work on to be drilled. In using it for a hand drilling machine it can be attached to any frame in the same manner.

It will be seen by the above described machinery that the spindle G can be placed on any angle and firmly held by set screw M and that the head D can be placed at any distance from the post A, from said head D, to the end of the tube B, and that the tube B can be placed at right angles or at any angle in relation to the jaws W. W, by turning the post A in said jaws, so that a hole can be made at any angle desired.

Having fully described the construction and operation of my improved hand and power drilling machine, what I claim therein as new and desire to secure by Letters Patent is:—

1. Constructing an eye or box in the upper end of the post A; in combination with the hollow shaft B, and spindle frame D, arranged substantially as described; whereby the spindle carried by the frame D, may be set and operated at any required distance from an angle to the said post A, as hereinbefore set forth.

2. The combined arrangement of the hollow shaft B, frame D, gears F, F', and spindle C, and G, with their projecting ends substantially as described whereby the drill spindle may be driven either directly, or through the medium of shaft C, and bevel gears, as and for the purpose set forth.

3. The arrangement of the removable platen, or face plate U, with the sliding clamp jaws W, collars V, and set screw X, as specified.

HORACE WOODMAN. [L. S.]

Witnesses:
 F. D. EDGERLY,
 SIMON P. MCKENNY.